Patented Oct. 12, 1948

2,451,182

UNITED STATES PATENT OFFICE 2,451,182

COMPOSITE ARTICLE

George H. Taft, Hudson, Ohio, assignor to The B. F. Goodrich Company, New York, N. Y., a corporation of New York No Drawing. Continuation of application Serial No. 400,097, June 27, 1941. This application September 8, 1943, Serial No. 501,561

9 Claims. (Cl. 117—139)

This invention relates to a new composite article and pertains more specifically to articles having a thin layer of a vinyl chloride polymer in contact with a layer of rubber. The two layers may be held in contact either by means of an adhesive or merely by the configuration of the article. This application is a continuation of my co-pending application Ser. No. 400,097 filed June 27, 1941, now abandoned.

It is well known that plasticized compositions of a polymer in which the predominant constituent is vinyl chloride, such as polyvinyl chloride, copolymers of vinyl chloride with minor proportions of vinyl cyanide, vinyl acetate or other vinyl esters, vinylidene chloride, or methyl acrylate, methylmethacrylate and their homologues, may be adhered to vulcanized or unvulcanized rubber by chlorinating the surface of the rubber. However, although excellent adhesion may be secured in this manner, the vinyl polymer tends to crack when the composite article is flexed. This phenomenon is particularly noticeable after the composite material has aged a few days, and when the layer of plasticized vinyl halide polymer is relatively thin compared to the layer of rubber. Even in those cases where complete cracking of the plasticized vinyl halide polymer layer does not occur, severe wrinkling cannot be avoided. Similar results may be observed when other bonding agents, such as a solution of chlorinated rubber in a volatile solvent, are used, or when no adhesive at all is used, as for example in the case of rubber hose or rubber-insulated wire coated with a thin film of a vinyl chloride polymer.

Because of the resistance of plasticized polyvinyl halide composition to air, light, chemical reagents, oil, gasoline, and the like, it is often desirable to protect the surface of a rubber article, which is not so resistant to these materials, by means of a thin layer of the vinyl polymer applied in the form of a paint or lacquer. However, the foregoing difficulties make it impossible to use the polymer in this way.

I have now discovered a method for preventing the wrinkling and cracking of thin layers of polyvinyl halide compositions in contact with vulcanized rubber compositions. My invention comprises using, as a plasticizer for the polymer, a material which has no substantial swelling effect upon the rubber composition used, and saturating the vulcanized rubber with this plasticizer before applying the polymer layer to it. It is desirable to avoid plasticizers which have a pronounced swelling effect upon rubber or which dissolve it because the tensile strength and other physical characteristics of the rubber then suffer greatly when it is saturated with plasticizer.

Although saturation of the rubber with the plasticizer is the optimum condition for prevention of cracking, somewhat less than saturation may provide the best adhesion between the layers. If an excessive amount of plasticizer be used in the rubber, it prevents effective chlorination because of the bleeding effect. Moreover, the layer of oily plasticizer on the surface of the rubber prevents close contact between the chlorinated surface of the rubber and the plasticized vinyl polymer, with subsequent poor adhesion.

Plasticizers which may be used in my invention comprise any of the ordinary plasticizers for the gamma polymer of vinyl chloride or copolymers of vinyl chloride with minor proportions of other polymerizable compounds, which have no more than a slight swelling effect upon the rubber. Among the plasticizers which I have found satisfactory are methyl phthalyl ethyl glycollate, ethyl phthalyl ethyl glycollate, propyl phthalyl propyl glycollate, butyl phthalyl butyl glycolate, amyl phthalyl amyl glycollate, di-beta-butoxyethyl phthalate, di-beta-butoxyethyl sebacate, beta-ethoxyethyl phthalyl butyl glycollate, amyl phthalyl butyl glycollate, and the like.

Plasticizers having a pronounced swelling effect upon vulcanized rubber, or which dissolve the rubber, cannot be used because the large amount necessary to saturate the rubber materially reduces its tensile strength and destroys its other desirable physical characteristics.

The plasticizer may be compounded in the rubber stock by milling, or the stock may be immersed in the plasticizer, either at room temperature or at an elevated temperature until the desired amount has been absorbed. Usually the desired amount of plasticizer is from 1 to 5% by weight. If chlorine or bromine water is to be used to halogenate the rubber surface in order to obtain adhesion, the plasticizer may be introduced as an emulsion in this medium. Other means of adhesion, for example coating the surfaces with suitable cements, may also be used.

As a specific example of my invention, I have prepared the following rubber composition, in which the parts are by weight:

| | |
|---|---|
| Rubber | 100 |
| Carbon black | 50.0 |
| Zinc oxide | 3.5 |
| Stearic acid | 3.0 |
| Sulfur | 3.0 |
| Pine tar | 1.5 |
| 2-mercaptobenzothiazole | 1.0 |

Sheets of this stock, after curing 45 minutes at 280° F., were immersed for varying lengths of time at room temperature in butyl phthalyl butyl glycollate, then wiped dry, treated with chlorine water for three minutes at room temperature, washed, and dried. A solution of a plasticized polyvinyl chloride composition in a volatile solvent was then brushed on, and after drying 24 hours at room temperature, a second coat was applied. The solution used had the following composition, in which the parts are by weight:

| | |
|---|---|
| Gamma polyvinyl chloride | 5.24 |
| Titanium dioxide | 5.80 |
| Lead titanate | 5.46 |
| Butyl phthalyl butyl glycollate | 3.50 |
| Methyl ethyl ketone | 80.00 |

In the table below, the left-hand column shows the number of hours that the rubber stock was immersed in the plasticizer, the middle column shows the percent increase in weight of the rubber from the absorption of the plasticizer, and the right-hand column shows the number of hours exposure of the coated rubber to a mercury-arc ultra violet light which was necessary to cause the adhered polyvinyl chloride film to crack when the composite article was flexed:

| Hours Immersed | Percent Absorption of Plasticizer | Hours exposure to mercury arc light before cracking |
|---|---|---|
| 8 | 1.7 | 24 |
| 24 | 2.9 | 30 |
| 48 | 4.1 | 300 |
| 96 | 5.4 | 312 |

Adhesion between the layers was satisfactory in all cases, but best for the sample immersed 24 hours. Similar results may be obtained with other plasticizers for gamma polyvinyl chloride which do not have an appreciable swelling action on or solvent power for natural rubber. Other polymers in which the predominant constituent is vinyl chloride may be used with like results.

Although I have herein disclosed specific examples of my invention, I do not intend to limit myself thereto, but only to the spirit and scope of the appended claims.

I claim:

1. A composite article comprising a thin layer of a polymer in which the predominant constituent is vinyl chloride plasticized with a material which has no substantial solvent power for vulcanized natural rubber, in contact with a layer of vulcanized natural rubber containing a substantial amount of the same plasticizer insufficient to saturate the rubber.

2. A composite article comprising a thin layer of gamma polyvinyl chloride plasticized with a material which has no substantial solvent power for vulcanized natural rubber, adhered to a layer of vulcanized natural rubber containing a substantial amount of the same plasticizer insufficient to saturate the rubber, said rubber layer being chlorinated at the surface adhered to the polyvinyl chloride.

3. A composite article comprising a thin layer of gamma polyvinyl chloride plasticized with butyl phthalyl butyl glycollate adhered to a layer of vulcanized natural rubber containing a substantial amount of butyl phthalyl butyl glycollate insufficient to saturate the rubber, said rubber layer being chlorinated at the surface adhered to the polyvinyl chloride.

4. A composite article comprising a thin layer of gamma polyvinyl chloride plasticized with ethyl phthalyl ethyl glycollate adhered to a layer of vulcanized natural rubber containing a substantial amount of ethyl phthalyl ethyl glycollate insufficient to saturate the rubber, said rubber layer being chlorinated at the surface adhered to the polyvinyl chloride.

5. A method for forming a composite article which comprises placing in contact a thin layer of a polymer in which the predominant constituent is a vinyl chloride plasticized with a material which has substantially no solvent power for vulcanized natural rubber, and a layer of vulcanized natural rubber containing a substantial amount of the same plasticizer insufficient to saturate the rubber.

6. A method for forming a composite article which comprises immersing a sheet of vulcanized rubber in butyl phthalyl butyl glycollate at room temperature for 24 to 48 hours, removing it from the glycollate, immersing the sheet in chlorine water for 2 to 5 minutes, washing and drying the sheet, applying to the surface thereof a solution in methyl ethyl ketone of gamma polyvinyl chloride plasticized with butyl phthalyl butyl glycollate, and removing the methyl ethyl ketone by evaporation.

7. A method for forming a composite article which comprises introducing into a sheet of vulcanized rubber at room temperature a substantial amount of butyl phthalyl butyl glycollate insufficient to saturate the rubber, chlorinating the surface of the rubber sheet, applying to the surface a solution in methyl ethyl ketone of gamma polyvinyl chloride plasticized with butyl phthalyl butyl glycollate, and evaporating the solvent.

8. A method for forming a composite article which comprises introducing into a layer of vulcanized natural rubber a plasticizer which has substantially no solvent power for the rubber in a substantial amount insufficient to saturate the rubber, chlorinating the surface of the layer of rubber, and adhering to said surface a thin layer of a polymer in which the predominant constituent is vinyl chloride plasticized with the same plasticizer.

9. A composite article comprising a thin layer of a polymer in which the predominant constituent is vinyl chloride plasticized with a material which has no substantial solvent power for vulcanized natural rubber, adhered by means of chlorinated rubber to a layer of vulcanized natural rubber containing a substantial amount of the same plasticizer insufficient to saturate the rubber.

GEORGE H. TAFT.

REFERENCES CITED

The following references are of record in the file of this patent:

UNITED STATES PATENTS

| Number | Name | Date |
|---|---|---|
| 2,234,611 | Trumbull | Mar. 11, 1941 |

FOREIGN PATENTS

| Number | Country | Date |
|---|---|---|
| 546,690 | Germany | Mar. 14, 1932 |